(12) United States Patent
Crocker et al.

(10) Patent No.: US 12,422,587 B1
(45) Date of Patent: Sep. 23, 2025

(54) SYSTEM AND METHOD FOR THE CALIBRATION OF A HYDROPHONE LINE ARRAY IN A WATER-FILLED TANK

(71) Applicant: The United States of America as represented by the Secretary of the Navy, Newport, RI (US)

(72) Inventors: Steven E Crocker, Bristol, RI (US); Ronald R Smalley, Jr., North Kingstown, RI (US); Daniel R Nashold, Mattapoisett, MA (US); Mark R Grden, South Kingstown, RI (US); Ryan Amaral, Fall River, MA (US); Brian W Duarte, Warwick, RI (US); William H Slater, New Bedford, MA (US); Michael A Bergeron, Coventry, RI (US); Jason R Bernier, Exeter, RI (US); Amarilis Blankenship, Saunderstown, RI (US); Joseph A Carreiro, New Bedford, MA (US); Ernest J Briggs, Exeter, RI (US)

(73) Assignee: The United States of America as represented by the Secretary of the Navy

( * ) Notice: Subject to any disclaimer, the term of this patent is extended or adjusted under 35 U.S.C. 154(b) by 182 days.

(21) Appl. No.: 18/236,972

(22) Filed: Aug. 23, 2023

(51) Int. Cl.
*G01V 13/00* (2006.01)
*G01V 1/30* (2006.01)

(52) U.S. Cl.
CPC .............. *G01V 13/00* (2013.01); *G01V 1/307* (2013.01)

(58) Field of Classification Search
CPC ................................ G01V 1/186; G01V 1/187
See application file for complete search history.

(56) References Cited

U.S. PATENT DOCUMENTS

| 3,859,620 A | * | 1/1975 | Percy | G10K 11/008 367/13 |
| 3,864,664 A | * | 2/1975 | Trott | G01V 13/00 367/13 |

(Continued)

OTHER PUBLICATIONS

Takahashi, Ryuzo, and Tomonari Akamatsu. "Measurement of the Stable Sound Field in the Small Tank for Simple Calibration." The Journal of the Marine Acoustics Society of Japan 45.3 (2018): 99-109. (Year: 2018).*

*Primary Examiner* — Isam A Alsomiri
*Assistant Examiner* — Jonathan D Armstrong
(74) *Attorney, Agent, or Firm* — James M. Kasischke; Jeffry C. Seveson

(57) ABSTRACT

A method is provided to measure the complex sensitivity of hydrophone data channels across a range of frequencies by using a water-filled tank with proximate boundaries. A hydrophone array and reference hydrophone are helically affixed to a test fixture resting on a rotation platform. When the test fixture is submerged in the tank; the platform rotates about a contour of the platform in intervals for a predetermined time interval before indexing to the next angle. Signals transmitted by an acoustic projector in the tank are received on the hydrophones of the line array and the calibrated reference hydrophone. Electrical signals from the reference hydrophone are transmitted over an electrical cable and received by the acoustic data processor for use in calibrating the hydrophone line array. Electrical signals from the hydrophones of the hydrophone line array are also transmitted to the data processor.

13 Claims, 6 Drawing Sheets

(56) References Cited

U.S. PATENT DOCUMENTS

| | | | | |
|---|---|---|---|---|
| 5,654,937 | A * | 8/1997 | Striffler | G01V 1/20 |
| | | | | 367/13 |
| 9,551,811 | B1 * | 1/2017 | Crocker | G01V 13/00 |
| 9,835,764 | B2 * | 12/2017 | Crocker | G01V 13/00 |
| 11,209,571 | B1 * | 12/2021 | Crocker | G01V 13/00 |
| 11,408,986 | B1 * | 8/2022 | Huang | G01S 15/88 |
| 2016/0091361 | A1 * | 3/2016 | Crocker | G01V 13/00 |
| | | | | 367/13 |

* cited by examiner

SYSTEM AND METHOD FOR THE CALIBRATION OF A HYDROPHONE LINE ARRAY IN A WATER-FILLED TANK

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is a method for calibration of hydrophone line array over a broad range of frequencies in a water tank with proximate boundaries.

(2) Description of the Prior Art

Methods for acoustic calibrations of hydrophone line arrays (known in the prior art) are performed in open bodies of water using a method described by U.S. Pat. No. 3,859,620 to Percy and additionally described by U.S. Pat. Nos. 9,551,811 and 9,835,764 and 11,209,571 to Crocker et.al. In the calibration methods of the patent references; a hydrophone line array (or module thereof) is attached to a cylindrical mesh device having a diameter of approximately three meters. Structural reinforcements support the mass of the array.

A calibration signal is provided by either an acoustic projector or by an ambient sound field in the open body of water. At least one calibrated reference hydrophone provides the reference signal for which line array acoustic data channels are compared. In use, the entire measurement apparatus is lowered into the water; where calibration measurements are performed in sound fields with well-known spatial properties. A desired measurement is the receive voltage sensitivity of the line array acoustic data channels.

Another common feature is that the methods require a large volume of water which is found only in natural open bodies (e.g., springs, ponds, and lakes). Undesirable features of open water acoustic test facilities that can disrupt operations include: relatively high operating and maintenance costs; dependence on natural geological features that are not conveniently located; encroachment from local development; and an exposure to natural hazards such as weather and wildlife.

Secondary calibration of a hydrophone, or an array thereof, is often performed using a free-field comparison method. In the method, a calibrated reference standard hydrophone measures the sound pressure of signals transmitted by an acoustic projector. The free-field voltage sensitivity of a hydrophone is the ratio of the open circuit voltage of the hydrophone to the sound pressure in the undisturbed free field in the position of the reference center of the hydrophone if the hydrophone was removed.

The free-field voltage sensitivity is a complex quantity with a modulus and a phase. The modulus is traditionally expressed as decibels relative to one volt per micropascal (i.e., dB re 1V/uPa). The phase is expressed in degrees relative to the phase of the acoustic signal at the acoustic center of the hydrophone.

A fundamental requirement of the free-field comparison calibration method is the use of an acoustic projector for transmitting a coherent acoustic signal with a sound pressure that is sufficient to overcome all sources of measurement noise including ambient noise in the test environment, the electronic self-noise of the device under test (DUT) hydrophone, and the calibrated reference standard hydrophone. This requirement is satisfied in methods taught by the prior art by using an acoustic projector to transmit coherent sound signals are observed either sequentially in a comparison replacement calibration or simultaneously in a side-by-side comparison calibration.

Another requirement of standard comparison calibration methods is that the calibration measurements are performed in an acoustic free-field. Among the common sources of measurement uncertainty are: acoustic scattering from the hydrophone mount (or vibrations picked up and conducted by the mount); interference from acoustic reflections leading to a lack of free-field conditions; and a lack of acoustic far-field conditions.

Calibration of hydrophone line arrays taught by the prior art (U.S. Pat. No. 3,859,620 to Percy) do not satisfy these fundamental acoustic calibration requirements. In the first instance, the desired frequencies for the calibrations include frequencies that are substantially less than the minimum operating frequency of standard underwater acoustic projectors for transmitting calibration signals into the water.

In a second instance, the Percy reference presupposes the existence of a water-filled anechoic chamber in which acoustic boundary reflections are absent. The assumed anechoic test environment does not exist. The reference also presupposes the existence of an acoustically-transparent measurement apparatus. The measurement apparatus includes structural elements to support the significant mass of the array. As such, these elements may interfere with acoustic transparency.

The measurement apparatus taught by the Percy reference may behave as acoustically transparent over a range of frequencies (10 Hz to 1000 Hz). However, a measurement apparatus that can support the mass of a hydrophone line array and remain acoustically transparent at frequencies up to 10 kHz is unknown. Therefore, the measurement apparatus and the measurement environment create interference from acoustic reflections; thereby, leading to a lack of free-field conditions with the result of significantly increasing measurement uncertainty.

Crocker (U.S. Pat. No. 9,551,811) addresses the problem of inadequate sound pressure for transmitted signals at a very low frequency. The patent discloses a calibration method that uses sound in the natural environment as the calibration signal. The reference shows that the sound pressure observed at any two field locations in the volume of water occupied by the measurement apparatus have effectively equal amplitude and are highly correlated for acoustic wavelengths that are large in relation to the distance between the observations.

While these features enable calculation of the complex voltage sensitivity (i.e., modulus and phase) of the device under test; the requirement for correlated ambient sound measurements limits the maximum frequency at which the calibrations could be performed to approximately 60 Hz when using the acoustic measurement apparatus described in the Crocker patent.

U.S. Pat. No. 9,835,764 addresses the problem of reflections and scattering from boundaries in the test environment and by the measurement apparatus itself. The patent by Crocker, Casmiro, Cutler and Smalley teaches a method with a plurality of calibrated reference hydrophones to observe a sound field created by an acoustic projector in the volume of water occupied by the measurement apparatus. Acoustic data collected by the hydrophones are then supplied to an algorithm that estimates the complex acoustic pressure (i.e., modulus and phase) at all points on the hydrophone line array based on an empirical model of the acoustic field.

The invention of the reference patent reduces measurement uncertainty to a maximum frequency of approximately 800 Hz when using eight calibrated reference hydrophones to observe the sound field. The upper frequency limit may be improved by sampling the sound field with finer spatial resolution; thereby, increasing the number of required calibrated reference hydrophones. The lower frequency limit in the reference was approximately 30 Hz which is the minimum operating frequency of standard underwater acoustic projectors.

U.S. Pat. No. 11,209,571 by Crocker and Smalley teaches a method to extend the range of frequencies at which a natural ambient sound field can be used as the calibration signal to a maximum frequency of 10 kHz. However, the measurand is limited to the modulus of the complex sensitivity. The Crocker patent discloses a method to calibrate the hydrophones of a line array that benefits from the well-understood statistical properties of the quasi-diffuse sound fields that exist in open bodies of water.

Other alternatives employ the familiar cylindrical fixture and achieve significant reductions in the time and cost to calibrate a hydrophone line array. However, a common feature of these methods is that the methods either require unrealistic boundary conditions or the methods require a large water-filled volume that is only found in naturally formed, open bodies of water.

A method is therefore needed to calibrate hydrophone line arrays in a smaller volume of water, as may be located inside an enclosed laboratory facility.

BRIEF SUMMARY OF THE INVENTION

It is therefore a primary object and general purpose of the present invention to provide a method to measure the modulus of the complex receive voltage sensitivity of hydrophone data channels in a line array over a broad range of frequencies when the hydrophones of a line array are submerged in a water tank with proximate boundaries.

To attain the object of the present invention, a system and method of use is provided to calibrate the hydrophones of a line array in a water-filled tank having parallel boundaries of five rigid surfaces and one pressure release surface (the free surface of the water). A rectangular tank with parallel boundaries represents a stressing due to the dominance of discrete and possibly degenerate acoustic normal modes.

The acoustic field in the tank is a superposition of numerous acoustic normal modes which are determined by dimensions, frequency, sound speed, acoustic boundary conditions and the location of sound sources within the tank. The invention applies to other tank geometries such as those with non-parallel or curved walls.

A novelty of the invention is the ability to rotate the hydrophones of the array and calibrated reference hydrophones throughout an enclosed water volume. The paths of the hydrophones are observed energies that result from the integration of the mean squared acoustic pressure observed across time, space and frequency. The result is that the array hydrophones and calibrated reference hydrophones observe an acoustic energy-like quantity that is effectively equal for all of the hydrophones, despite the complexity of the sound field in which the measurements are performed.

The sensitivity of each array hydrophone is then computed by comparing the observed energy with the energy observed by at least one calibrated reference hydrophone during the acoustic measurements.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

The present invention incorporates the prior art as disclosed by the Percy patent references and subsequently improved by the Crocker, et.al patent references. In particular, the present invention uses the cylindrical test fixture as disclosed by Percy (U.S. Pat. No. 3,859,620) with improvements disclosed by Crocker (U.S. Pat. No. 9,551,811), by Crocker, et.al. (U.S. Pat. No. 9,835,764), and by Crocker and Smalley (U.S. Pat. No. 11,209,571) to arrange the array into a cylindrical volume that is compact relative to the array aperture.

Figure 1:
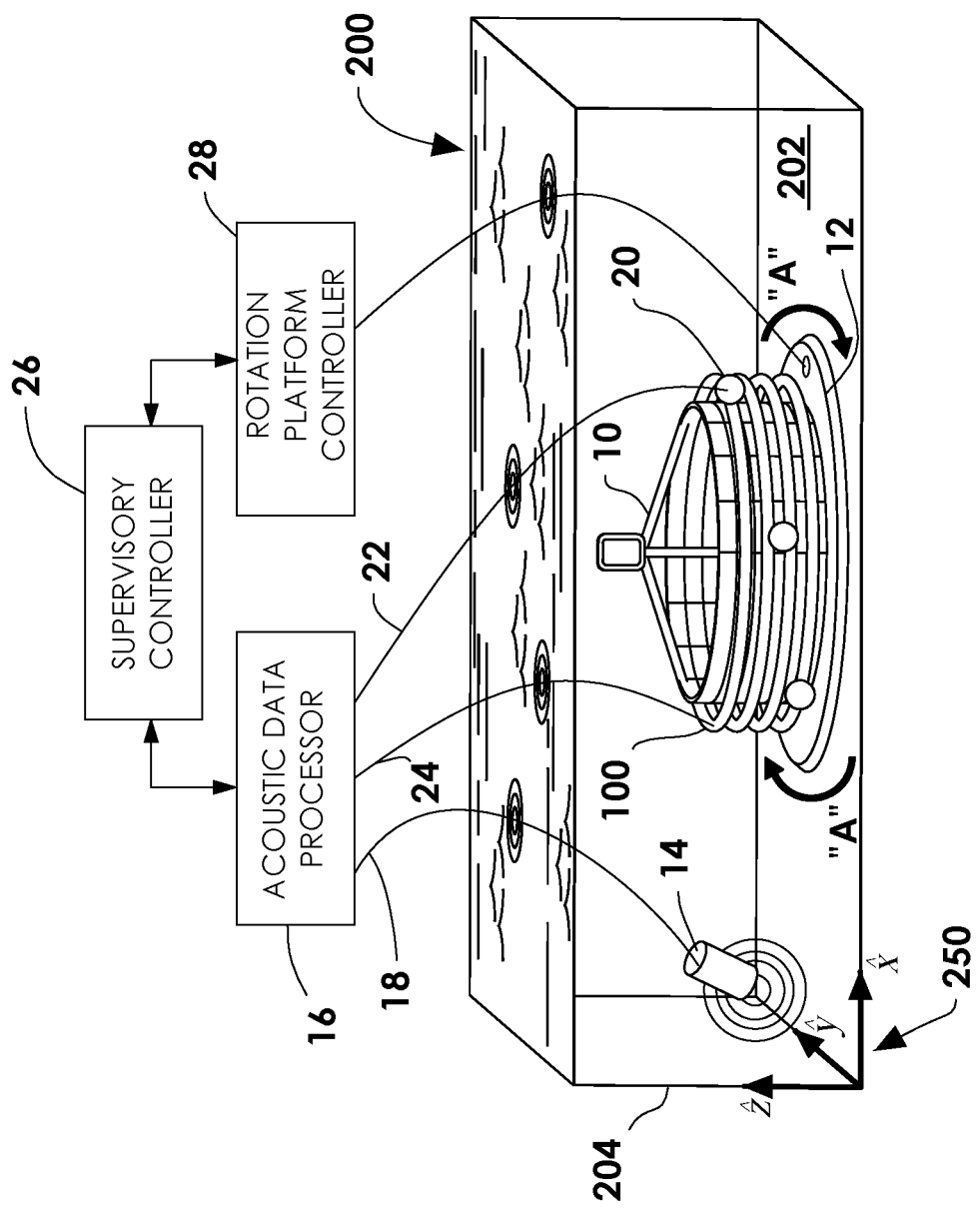
FIG. 1 depicts a measurement system of the present invention with the measurement system used to collect acoustic data for calibrating a hydrophone line array.

As depicted in FIG. 1, a hydrophone line array 100 (or discrete module thereof) is helically affixed to a cylindrical fixture 10 of hollow circular tubes joined by vertical supports and covered with a wire mesh that is substantially open to the passage of acoustic waves. The circular tubes and the vertical supports are perforated by holes that allow water to enter and air to escape, when the fixture is submerged. The array is affixed to the cylindrical fixture using plastic tie wraps or similar devices known in the prior art.

The cylindrical fixture 10 with a hydrophone array 100, rests on a rotation platform 12 that supports the mass of the hydrophone array and the cylindrical fixture. When submerged, the rotation platform 12 can rotate about a longitudinal axis of the cylindrical fixture 10 in direction "A". The rotation platform 12 can rotate in comparatively small and discrete angular intervals for a predetermined interval of time before indexing to the next predetermined angle (around the longitudinal axis). Acoustic data is collected while the rotation platform 12 is at rest in the interval between discrete rotations. The cylindrical fixture 10 and rotation platform 12 may be part of a single apparatus.

More specifically, the rotation platform 12, the cylindrical fixture 10 and the array 100 are lowered into, and can be removed from, a water-filled tank 200 with the aid of an overhead crane (not shown). When submerged, the rotation platform 12 rests on a floor 202 of the water-filled tank 200. Once the rotation platform 12 is resting on the tank floor 202; an acoustic projector 14 receives a Gaussian broadband electrical signal from an acoustic data processor 16 over an electrical cable 18. The acoustic projector 14 transmits a broadband acoustic signal into the water-filled tank 200. It is advantageous to locate the acoustic projector 14 as close as practical to a corner formed by walls 204 and the floor 202.

Sound signals transmitted by the projector 14 are received on the hydrophones of the line array 100 and are received on at least one calibrated reference standard hydrophone 20. Electrical signals from the reference standard hydrophone(s) 20 are transmitted over an electrical cable(s) 22 and received by the acoustic data processor 16. Electrical signals from the hydrophones of the line array test article (hydrophone line array 100) are also transmitted over a cable 22 and received by the acoustic data processor 16. Electrical signals transmitted by the hydrophone line array 100 may be either analog or digital and need not be accurately synchronized with signals received from the reference standard hydrophone(s) 20.

The above measurement is repeatedly performed where the angle of the rotation platform 12 changes sequentially between each acoustic measurement until one full rotation of the rotation platform around the longitudinal axis is completed. A supervisory controller 26 initiates the transmission and collection of acoustic signals by the acoustic data processor 16. At suitable intervals, the supervisory controller 26 also commands a rotation platform controller 28 to cause the rotation platform 12 to rotate to a predetermined angle for the collection of the next acoustic data capture.

The change in angle between each acoustic measurement is determined to ensure that the spatial displacements of the hydrophone line array 100 and reference hydrophones 20 are small relative to the length scale of variations in acoustic pressure when integrated across a suitable frequency band. The process is repeated until the acoustic measurements have been performed at a sequential set of angular rotations that span one full rotation (360°) of the rotation platform 12. Note that the rotations may also be continuously performed if the angular rate (i.e., degrees per second) and sounds emitted by the rotator mechanism are sufficiently low.

The method of the invention can measure the modulus of the free-field voltage sensitivity for hydrophone data channels in a line array over one frequency or a broad range of frequencies. The hydrophones being calibrated are referred to as the devices under test (DUT). The measurand provided by this method is the receive voltage sensitivity of the hydrophone channels in volts per pascal. This quantity is expressed in decibels relative to one volt per micro-pascal.

The sound field in the water-filled tank 200 is bound by parallel surfaces or the walls 204. FIG. 1 depicts the spatial properties of the sound field used to calibrate the hydrophones of the hydrophone line array 100 and to illustrate the advantages of the inventive method. Calculating a sound field in regular enclosures is well-known, with many applications related to architectural acoustics. The method describes the set of normal modes that can exist in a volume with known dimensions and filled with an acoustic medium of known sound speed.

As shown in the figure, a regular volume with parallel boundaries is assumed. A Cartesian system of coordinates 250 is employed where the unit vectors "$\hat{x}$", "$\hat{y}$", and "$\hat{z}$" constitute an orthogonal basis aligned with the boundaries of the tank 200. The dimensions of the tank 200 in the $\hat{x}$, $\hat{y}$, and $\hat{z}$ directions are defined as "$l_x$", "$l_y$", and "$l_z$", respectively. The boundary conditions for the acoustic pressure "p" on boundaries of the water-filled tank 200 are given by Equations (1), (2), and (3).

$$\left.\frac{\partial p}{\partial x}\right|_{x=0} = \left.\frac{\partial p}{\partial x}\right|_{x=l_x} = 0 \tag{1}$$

$$\left.\frac{\partial p}{\partial y}\right|_{y=0} = \left.\frac{\partial p}{\partial y}\right|_{y=l_y} = 0 \tag{2}$$

$$\left.\frac{\partial p}{\partial z}\right|_{z=0} = \left.\frac{\partial p}{\partial z}\right|_{z=l_z} = 0 \tag{3}$$

Equations (1) and (2) indicate that the derivative of sound pressure with respect to a distance normal to the boundary of the tank 200 is equal to zero on the rigid boundary condition of the tank walls 204. Equation (3) states that the tank floor 202 presents a rigid boundary condition to the acoustic field, while the sound pressure at the free surface of the water is zero as a pressure release boundary condition.

In the water-filled tank 200, a set of sound frequencies "$f_n$" exists at which acoustic normal modes may also exist as determined by the tank dimensions $l_x$, $l_y$, $l_y$, and a sound speed "c"; thereby, resulting in acoustic standing waves with large pressure amplitudes, also referred to as resonance conditions. The acoustic wave number components "$k_x$", "$k_y$", and "$k_z$" that satisfy the resonance condition are provided by Equations (4), (5) and (6)

$$k_x = \frac{n_x \pi}{l_x}, \qquad n_x = 0, 1, 2, 3, \ldots, \infty \tag{4}$$

$$k_y = \frac{n_y \pi}{l_y}, \qquad n_y = 0, 1, 2, 3, \ldots, \infty \tag{5}$$

$$k_z = \begin{cases} 0, & n_z = 0 \\ \frac{(2n_z - 1)\pi}{2l_z}, & n_z = 1, 2, 3, \ldots, \infty \end{cases} \tag{6}$$

where "$n_x$", "$n_y$" and "$n_z$" are indexes that identify the mode number components in the $\hat{x}$, $\hat{y}$ and $\hat{z}$ directions, respectively.

As a direct result of the boundary conditions, a normal mode can exist in the $\hat{x}$- and $\hat{y}$-directions when an integer number of half-wavelengths span the respective direction (1, 2, 3, . . . , ∞). However, because of dissimilar boundary conditions in the vertical, a normal mode can only exist in the $\hat{z}$-direction when the number of quarter-wavelengths spanned by the water depth is an odd integer (1, 3, 5, . . . , ∞). Therefore, a normal mode with one wavelength in the $\hat{x}$-direction, one-half wavelength in the $\hat{y}$-direction, and a one-quarter wavelength in the $\hat{z}$-direction is referred to as the [2, 1, 1] mode. The respective wavenumber components are computed using Equations (4), (5), and (6).

The acoustic wavenumber k relates to the frequency f and speed of sound "c" in water by Equation (7).

$$k = \frac{2\pi f}{c} \quad (7)$$

The natural frequencies $f_{n_x,n_y,n_z}$ at which the resonance condition for sound waves in the water-filled tank 200 are then computed is determined by Equation (8).

$$f_{n_x,n_y,n_z} = \frac{c}{2\pi}\sqrt{k_x^2 + k_y^2 + k_z^2} \quad (8)$$

The sound pressure amplitude throughout the water-filled tank 200 for each normal mode is determined by the modal amplitude $A_{n_x,n_y,n_z}$, wavenumber components $k_x$, $k_y$, and $k_z$, and location x, y, z, within the tank as relatable by Equation (9).

$$p_{n_x,n_y,n_z} = A_{n_x,n_y,n_z}\cos(k_x x)\cos(k_y y)\cos(k_z z) \quad (9)$$

The modal amplitudes $A_{n_x,n_y,n_z}$ are computed based on the wavenumber components $k_x$, $k_y$, and $k_z$, the location ($x_P$, $y_P$, $z_P$) of the acoustic projector 14 within the water-filled tank 200 as well as the sound pressure amplitude "$P_o$" realized by the acoustic projector at that location as shown in Equation (10).

$$A_{n_x,n_y,n_z} = =P_o \cos(k_x x_P)\cos(k_y y_P)\cos(k_z z_P) \quad (10)$$

Consideration of Equation (10) confirms that it is advantageous to locate the acoustic projector 14 as close as geometrically practicable to a corner in the water-filled tank 200 that is proximate to the tank floor 202 and the side walls 204 such that $x_P$, $y_P$, $z_P \to 0$. By minimizing the distance of the acoustic projector 14 from the tank wall corner, the modal amplitudes $A_{n_x,n_y,n_z}$ may be maximized as $k_x x_P \to 0$, $k_y y_P \to 0$, and $k_z z_P \to 0$ over a wide range of frequencies; thereby, increasing the number of modes excited (modal density) in a predetermined frequency band (e.g., $\frac{1}{3}^{rd}$ octave) across which the mean squared sound pressure observed by the hydrophones will be integrated.

As previously stated, the desired measurand is the modulus of the receive voltage sensitivity "M" of the hydrophones in a line array, defined as the ratio of the open-circuit voltage output by the hydrophone to the sound pressure at the hydrophone.

The fundamental principal employed by this measurement method pertains to the value of a line integral performed over a closed contour (a path) through a stationary field. If "g" is an arbitrary, spatially dependent field parameter, and $\vec{u}$ is a vector that traces a closed contour in that space, then the value "G" of the integral is independent of the start-end point on the closed contour, provided only that the integration path follows the closed contour "C" as shown in Equation (11).

$$\oint_C g(\vec{u})d\vec{u} = G \quad (11)$$

In this invention, the field variable of interest relates to the mean squared sound pressure as a function of frequency, a power-like quantity. It is calculated as the inner product of the Fourier transform "P(f)" and the complex conjugate "P*(f)". The Fourier transform P(f) relates to a time varying sound pressure p(t) where the finite duration of the signal is "T" and "j" is the square-root of minus one as shown in Equation (12).

$$\int_{-T/2}^{T/2} p(t)e^{-j2\pi ft}dt = P(f) \quad (12)$$

The closed contour C is the circular path taken by a hydrophone as the hydrophone line array 100 rotates through a full revolution. While the instantaneous locations of the hydrophones are different; the hydrophones that reside on a given horizontal plane follow the same closed contour, although with different start-end points. Each closed contour is defined by the elevation "z" above the tank floor 202 and the radius of the cylindrical test fixture 10 to which the hydrophone line array 100 is fixed. So long as the sound field is statistically stationary; the hydrophones at the same vertical displacement z will observe the same energy-like quantity $E_P$, the integral of the mean squared sound pressure over the frequency interval [$f_1$, $f_2$] and the closed contour $C_z$.

The frequency domain expression for the parameter "$E_P$" observed at an elevation "z" above the tank floor 202 is given by Equation (13) where the integrand is the inner product of the Fourier transform P of the acoustic pressure and the complex conjugate P* and T is the time span over which the measurement is performed $$T\oint_{\theta_n}^{\theta_n+2\pi}\int_{f_1}^{f_2} P(\theta, f)\cdot P^*(\theta, f)df\, d\theta = E_P. \quad (13)$$

A practical implementation employs digitally sampled hydrophone signals collected at a set of discrete angles as shown in Equation (14). The integrals of Equation (13) are replaced by summations, and the acoustic pressure complex amplitude P is computed using a complex discrete Fourier transform known in the art of signal processing.

In principle, neither the frequency resolution $\Delta f$ nor the angular resolution $\Delta\theta$ are required to be constant. The frequency resolution $\Delta f$ may vary as required to compute the summation over the interval [$f_1$, $f_2$] and the angular resolution $\Delta\theta$ may vary as required by a particular implementation of the method.

$$\sum_{\theta_n}^{\theta_n+2\pi} T\Delta\theta \sum_{f_1}^{f_2} P(\theta, f)\cdot P^*(\theta, f)\Delta f = E_P \quad (14)$$

The voltage output "V" of a hydrophone is related to the acoustic pressure [complex?] amplitude P at the hydrophone by the voltage sensitivity M, as shown in Equation (15), and where each quantity is complex and frequency dependent.

$$P(f)M(f)=V(f) \quad (15)$$

The modulus of the band averaged sensitivity $|M_i(f_1, f_2)|$ of the $i^{th}$ hydrophone data channel in the frequency band [$f_1$, $f_2$] is computed from a sequence of time dependent measurements of the voltage output by that hydrophone $v_i(t)$ and the acoustic pressure p(t) at that hydrophone. The sequential calibration measurements are repeated at discrete rotation angles θ of the test fixture 10 and summed to yield an energy-like quantity $E_V$ for the mean squared hydrophone output voltage $V_i$ in a frequency band spanning [$f_1$, $f_2$].

Computed in Equation (16) as:

$$\sum_{\theta_n}^{\theta_n+2\pi} T\Delta\theta \sum_{f_1}^{f_2} V_i(\theta, f) \cdot V_i^*(\theta, f) \Delta f = E_V \qquad (16)$$

where $V_i(f)$ is the complex voltage spectrum observed by the $i^{th}$ hydrophone in the array, computed as the complex discrete Fourier transform of the voltage time history $v_i(t)$.

The acoustic energy to which the hydrophone is exposed during one full rotation of the test fixture is $E_P$ as defined in Equations (14) and (15) from the output voltage and sensitivity of at least one calibrated reference hydrophone that is also affixed to the text fixture and thereby transits the closed contour $C_z$. The modulus of the receive voltage sensitivity $|M_i(f_1, f_2)|$ of the $i^{th}$ hydrophone in the frequency band $[f_1, f_2]$ is computed using Equation (17) and expressed in volts per micro-pascal.

$$|M_i(f_1, f_2)| = \sqrt{\frac{E_V}{E_P}} \qquad (17)$$

Equation (17) is evaluated at a suitable number of frequency bands to yield a frequency dependent representation of the hydrophone sensitivity. A common frequency set for evaluation is the set of one third octave bands where the sensitivities are stated at the set of center frequencies $f_c$, with upper and lower band limits $[f_1, f_2]$.

The receive voltage sensitivity level of the device under test hydrophone in a frequency band specified by the center frequency is then expressed in decibels referenced to one micro-pascal using Equation (17), where $f_c$ is the center frequency of the band that spans the interval $[f_1, f_2]$. Also, see Equation (18).

$$M_i(f_c) = 20 \log_{10}(|M_i(f_1, f_2)|) \qquad (18)$$

A practical simplification for the energy-like parameters $E_P$ and $EdV$ that is suitable for implementation during the calibration measurements is to perform the measurements with a fixed angular resolution $\Delta\theta$, to employ a fixed frequency resolution $\Delta f$, and to collect acoustic data records of equal duration T for the device under test hydrophones and reference hydrophones. When applied, Equation (14) and Equation (16) are simplified to yield Equations (19) and (20), respectively by $$\sum_{\theta_n}^{\theta_n+2\pi} \sum_{f_1}^{f_2} P(\theta, f) \cdot P^*(\theta, f) = \frac{E_P}{\Delta\theta \, \Delta f T} \qquad (19)$$

$$\sum_{\theta_n}^{\theta_n+2\pi} \sum_{f_1}^{f_2} V_i(\theta, f) \cdot V_i^*(\theta, f) = \frac{E_V}{\Delta\theta \, \Delta f T} \qquad (20)$$

The terms $\Delta\theta$, $\Delta f$, and T in the right-hand side denominators cancel out when taking the ratio in Equation (17).

Particular features of this method are suitable for the simultaneous calibration of multiple hydrophone line arrays resulting in even greater savings in the time and cost for calibrations performed in support of a high-volume production process. Among these features are that the method does not require precise control of sound field characteristics. The method only requires that the sound field statistics are stationary and that an adequate signal-to-noise ratio exists.

Furthermore, there is no signal attenuation due to geometric spreading. As such, there is no degradation of the signal-to-noise ratio in the water-filled tank because the sound field is composed of acoustic standing waves. Also, multiple acoustic projectors can be employed to satisfy requirements for greater overall acoustic energy across arbitrarily large frequency bands.

Additionally, measurements used to estimate the value of the energy-like parameter $E_P$ are local to the array being calibrated and integrated over the close contour $C_z$. As such, the measurements are not corrupted by scattering or reflections from other locations in the water-filled tank 200. In regard to other costs, modern computers, controllers and multi-channel data acquisition systems can be acquired and maintained at relatively low cost in comparison to the costs of providing the calibration service.

Figure 2:
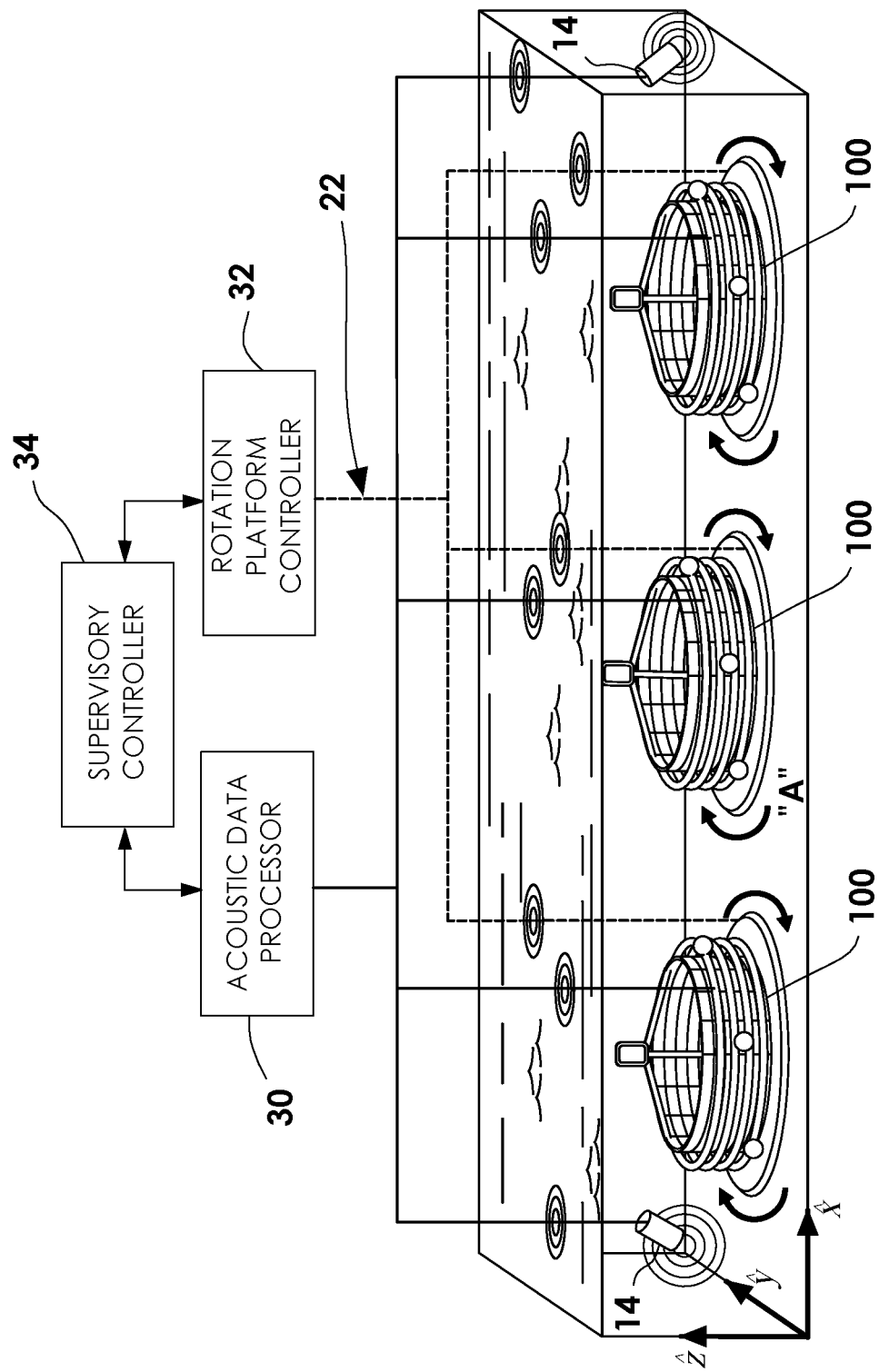
FIG. 2 depicts the measurement system employed to simultaneously calibrate more than one hydrophone line array.

FIG. 2 illustrates an embodiment of the present invention for the simultaneous calibration of multiple hydrophone line arrays 100, a multi-channel acoustic data processor 30 and a multi-channel rotation platform controller 32. The multiple hydrophone line arrays 100, the multi-channel acoustic data processor 30 and the multi-channel rotation platform controller 32 are controlled by a single supervisory controller 34.

Sampling of the mean squared sound pressure can be performed at an arbitrarily fine angular resolution $\Delta\theta$. A sampling resolution on the circular contour of $\Delta\theta=5$ provides suitable performance for a test fixture 10 with a 1.5-meter radius. However, since a modal structure of the sound field in a water-filled tank also varies in the vertical direction, under-sampling in the vertical can increase measurement uncertainty.

Estimates for the value of the parameter $E_P$ can be improved by sampling the vertical field structure with a small number of calibrated references hydrophones 20 affixed to the test fixture 10 at different vertical displacements as shown in FIG. 1. In the present method, the value of the parameter $E_P$ is estimated by interpolation at vertical displacements not sampled by a calibrated reference hydrophone 20.

Figure 3:
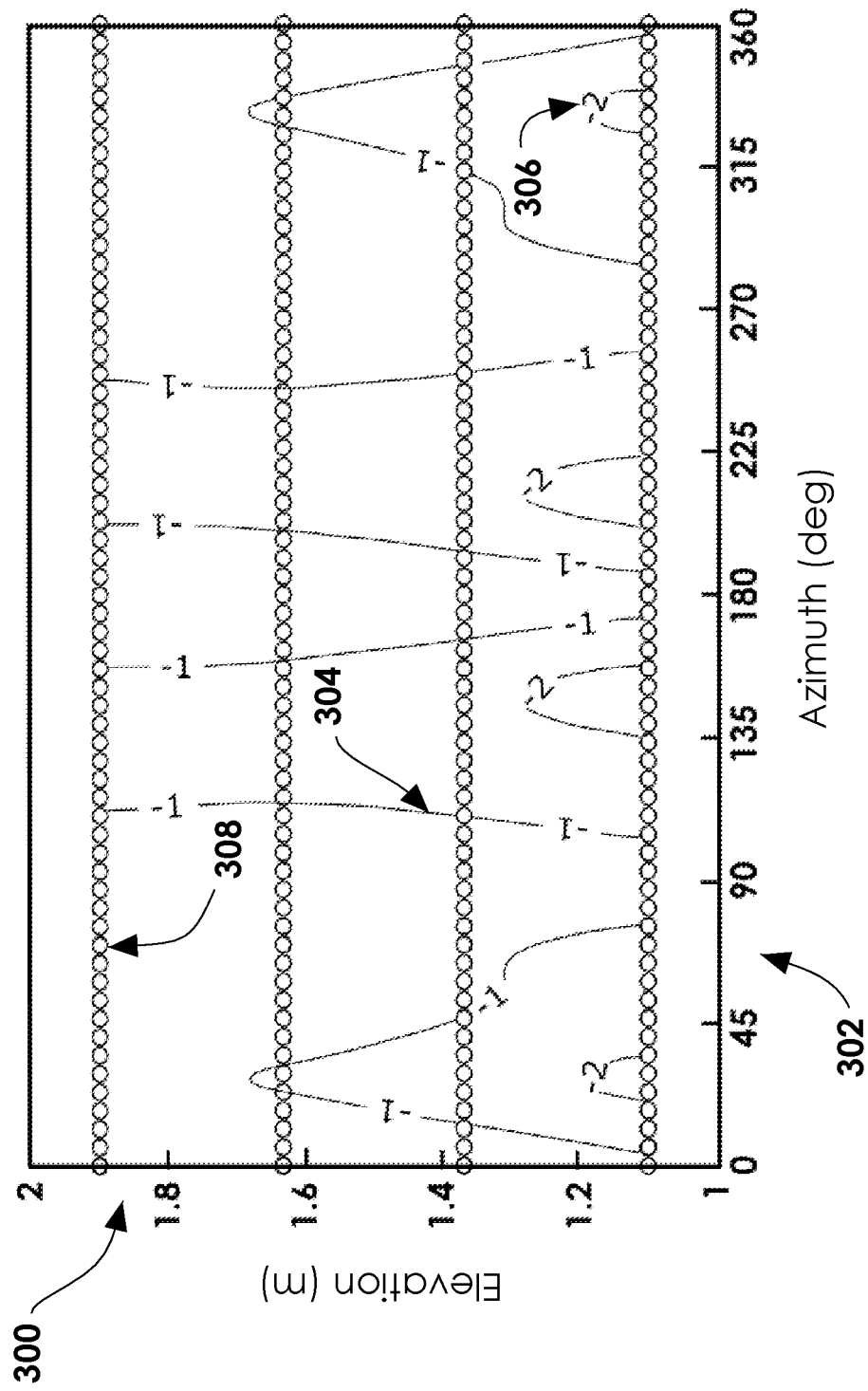
FIG. 3 is a diagram showing variations of the sound pressure level over angular and vertical dimensions of the test fixture.

FIG. 3 depicts the normalized sound pressure level (SPL) in the 500 Hz and a one-third octave band. The sound pressure level is displayed over the cylindrical spatial domain occupied by the hydrophone line array 100 and the calibrated reference hydrophones 20. The figure provides a vertical axis 300 depicting the elevation above the tank floor 202 and a horizontal axis 302 depicting the azimuth angular displacement about the longitudinal axis of the test fixture 10. Contours 304 show the normalized sound pressure level and a variation in the vertical and angular directions including a region 306 of a relatively lower sound pressure level. Locations in a sound field 308 sampled by four calibrated reference hydrophones are shown for an angular resolution $\Delta\theta=5$. The sound field is under-sampled in the vertical direction which can lead to increased measurement uncertainty when computing the receive voltage sensitivity of the device under test hydrophones using Equation (17).

Figure 4:
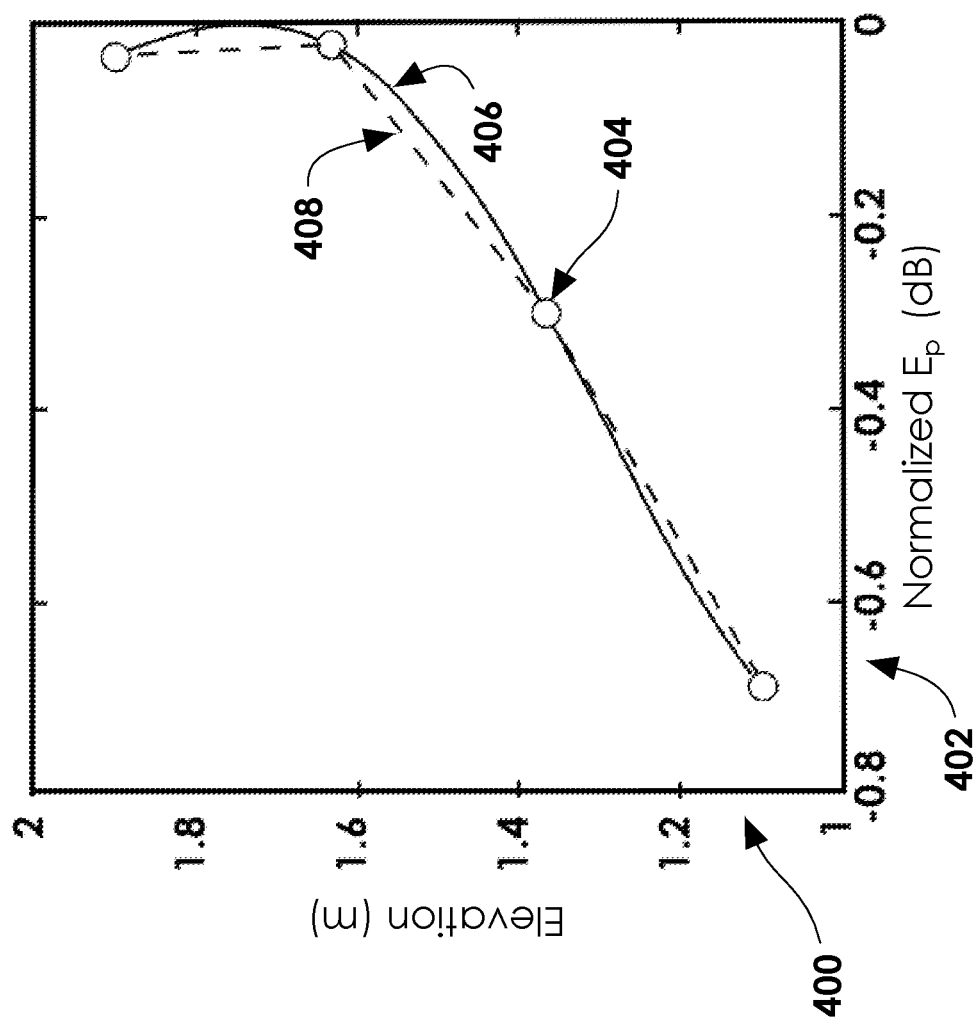
FIG. 4 is diagram showing vertical dependence of an energy-like acoustic parameter.

FIG. 4 shows a continuous variation in the value of $E_P$ in the 500 Hz one third octave band. The figure provides both a vertical axis 400 depicting the elevation above the tank floor 202 and a horizontal axis 402 depicting a normalized value of the parameter $E_P$. The graph shows the values 404 sampled by four calibrated reference hydrophones 100 evenly distributed in the vertical direction. The curve 406 depicts the continuous variation in the normalized value of $E_P$. The curve 408 depicts the estimates for this parameter based on a linear interpolation of the measured hydrophone data. In consideration of FIG. 3, uncertainty in the value of $E_P$ for a closed contour $C_z$ at a vertical displacement not sampled by a calibrated reference hydrophone is reduced by interpolation between adjacent calibrated reference hydrophones.

Figure 5:
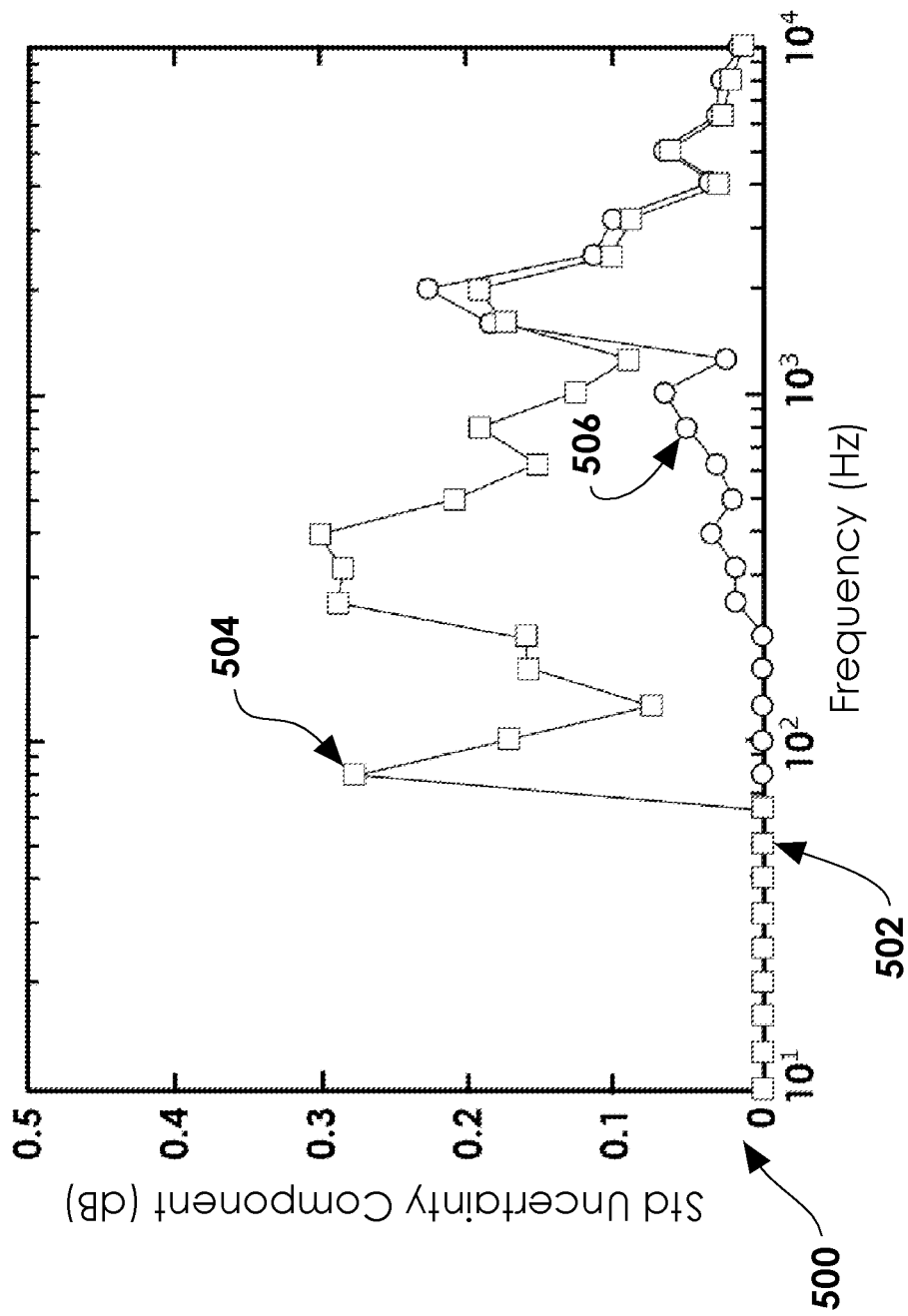
FIG. 5 is a diagram showing uncertainties when estimating the value of an energy-like acoustic parameter.

FIG. 5 depicts the effect of vertical sampling of the sound field across a range of frequencies from 10 Hz to 10 kHz. The figure provides a vertical axis 500 depicting the standard deviation of uncertainty due to under-sampling of the vertical sound field and a horizontal axis 502 depicting frequency. An example of the standard uncertainty 504 in the value of $E_P$ when using a single calibrated reference hydrophone is shown, and also an uncertainty 506 when using four calibrated reference hydrophones.

As the figure shows, there is an intermediate range of frequencies where the use of more than one calibrated reference hydrophone to sample the vertical structure of the sound field significantly reduces measurement uncertainty. This region is characterized by a small number of acoustic normal modes with wavelengths that are similar to the vertical distance spanned by the test fixture within the frequency band $[f_1, f_2]$.

Below this frequency region, the acoustic wavelengths are significantly longer than the vertical dimension of the cylindrical test fixture 10, and there is little vertical variation in sound pressure in the domain of the array being calibrated. Above this frequency range, the number of normal modes in the frequency band $[f_1, f_2]$ becomes high (e.g., $N \gg 10^3$) which tends to reduce variations in the value of $E_P$. As the modal density increases, the character of the sound field becomes more diffuse and less controlled by discrete standing wave modes. As the sound field becomes more diffuse, vertical variation in the value of $E_P$ is reduced, and the necessity of vertical sampling to reduce measurement uncertainty is less.

Figure 6:
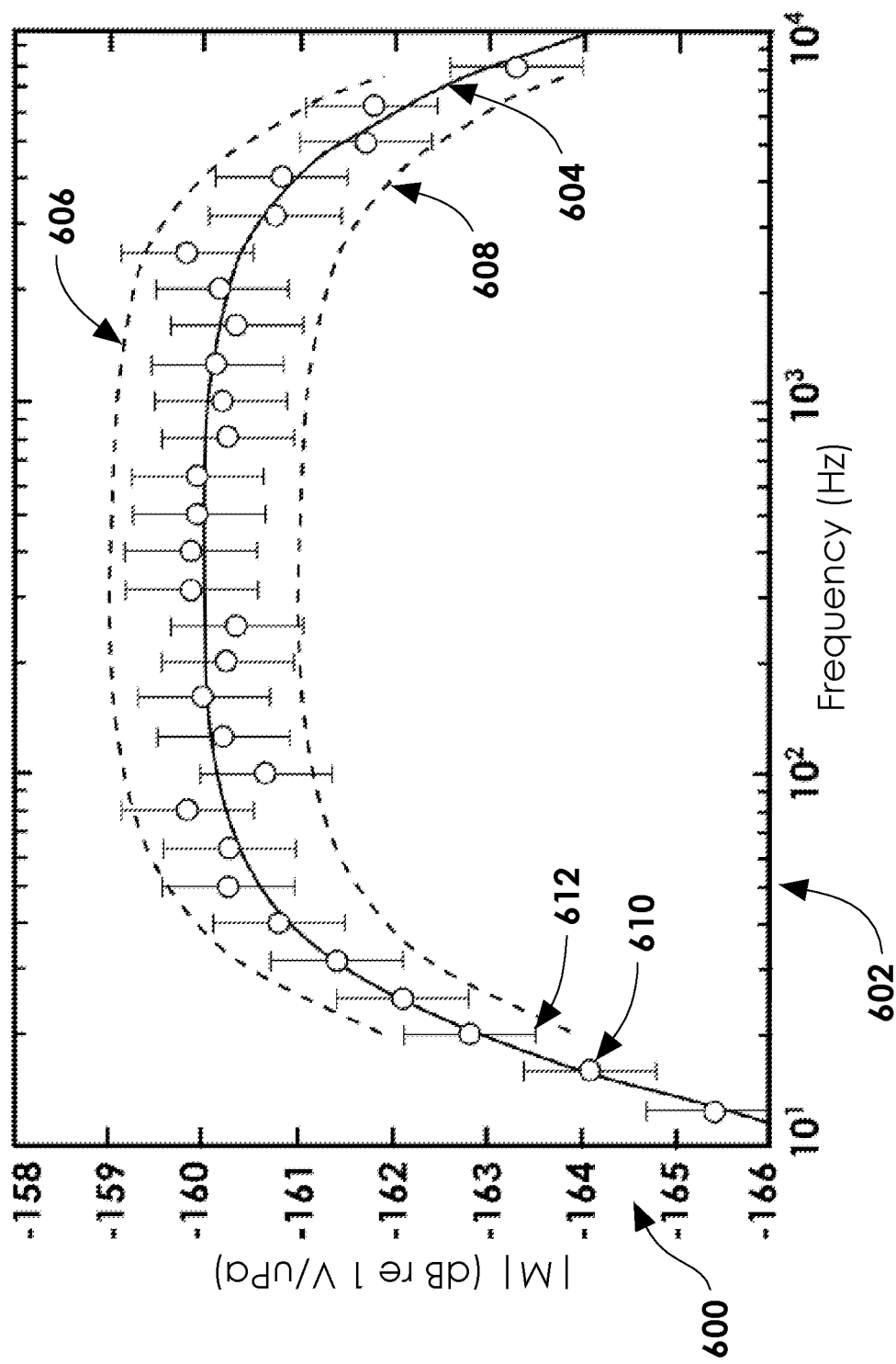
FIG. 6 is a diagram depicting the result of a calibration measurement performed using the method taught by the present invention.

An example of a calibration result for a hydrophone data channel is provided in FIG. 6 where the specified receive voltage sensitivity level is-160 dB re 1V/uPa, the manufacturing tolerance is ±1 dB, and the passband is 20 Hz to 8 KHz.

The figure provides a vertical axis 600 depicting the value of receive voltage sensitivity and a horizontal axis 602 depicting the value of frequency. The specified sensitivity 604 of the hydrophone channel is shown as a solid line. The upper tolerance 606 and lower tolerance 608 for sensitivities that satisfy the specification are shown as dotted lines.

Individual device under test (DUT) sensitivities calculated from measured data in accordance with Equation (17) are converted to decibels in accordance with standard engineering practice [See Equation (18)] are shown with circular markers 610 where the band averaged sensitivity levels are provided across the standard $\frac{1}{3}^{rd}$ octave band frequency set. Measurement uncertainties for the receive voltage sensitivity (RVS) levels are indicated by error bars 612 as estimated using methods taught by the prior art.

The present invention discloses a method to measure the modulus of the complex receive voltage sensitivity (RVS) of data channels in a towed hydrophone line array across a broad range of frequencies in a water-filled tank with proximate boundaries as may be located in an enclosed laboratory building. The novel aspect of the present invention uses energy-like quantities $E_P$ and $E_V$ that are estimated by the integration of the measured mean squared sound pressure and voltage across time, frequency and space. The spatial component of the integrated measurement is designed to ensure that all hydrophones (the device under test and the calibrated reference) follow the same closed contour while ensonified by an acoustic field with stationary statistical properties. In this way, all hydrophones observe the same integrated acoustic parameter $E_P$ which is a fundamental requirement of any acoustical comparison calibration method.

An alternative to the present invention is to calibrate each hydrophone in a towed line array sequentially using a measurement apparatus that does not introduce unwanted acoustic scattering and reflections of calibration signals transmitted by an acoustic projector. While such methods are known to be effective, the methods do not retain the efficiency associated with the simultaneous calibration of towed array hydrophones that number in the hundreds. Thus, these alternative methods require significantly more time and increased cost to calibrate a towed line array.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A method for a simultaneous calibration of a plurality of hydrophones in at least one line array over a range for at least one frequency in a water-filled tank bounded by a bottom and side walls as reflective surfaces, said method comprising the steps of:

providing a cylindrical test fixture of hollow circular tubes positioned parallel to each other and joined by vertical supports and covered with a wire mesh capable of being substantially open to acoustic waves;

providing a rotation platform with a first planar surface and a second planar surface;

affixing a hydrophone line array and a calibrated reference hydrophone helically to an exterior of the cylindrical fixture;

resting the rotation platform on the bottom of the water-filled tank with the first planar surface of the rotation platform;

positioning an acoustic data processor exterior to the water-filled tank with the acoustic data processor operationally connected to the hydrophone line array and the calibrated reference hydrophone;

positioning at least one acoustic projector within the water-filled tank with the at least one acoustic projector operationally connected to the acoustic data processor;

submerging the hydrophone line array, calibrated reference hydrophone and the cylindrical fixture to rest on the second planar surface and on a radius of the rotation fixture at a distance from the at least one acoustic projector;

rotating the rotation platform within a closed contour above the bottom of the water-filled tank with the rotation on the contour following a plurality of discrete angles and in predetermined time intervals about a longitudinal axis of the cylindrical fixture to a full rotation of the rotation platform wherein the rotation platform is at rest during a termination of each of the predetermined time intervals;

sending a Gaussian broadband electrical signal from the acoustic data processor to the acoustic projector;

transmitting a broadband acoustic signal into the water-filled tank with the at least one acoustic projector in response to the Gaussian broadband electrical signal;

collecting acoustic data from the broadband acoustic signal with the hydrophones of the line array and the calibrated reference standard hydrophone while the rotation platform is at rest during termination of each of the predetermined time intervals with said acoustic data collection step completing at one full rotation of the rotation platform on the contour and around the longitudinal axis of the rotation platform;

transmitting electrical signals from the calibrated reference standard hydrophone and the hydrophone line array to the acoustic data processor wherein a measurand of the transmitted electrical signals is a receive voltage sensitivity of the hydrophone channels; and calibrating a plurality of hydrophones in a line array over a range of at least one frequency based upon said transmitting electrical signals from the calibrated reference standard hydrophone and the hydrophone line array to the acoustic data processor step.

2. The method of claim 1 wherein the at least one acoustic projector is positioned proximate to a corner formed by the walls and the floor of the water-filled tank.

3. The method of claim 2 further comprising the steps of:
providing a supervisory controller operationally to the acoustic data processor;
activating the acoustic data processor for initiating transmission and collection of acoustic signals with the supervisory controller; and
providing a rotation platform controller operationally connected to the supervisory controller and the rotation platform wherein said rotating the rotation platform step is activated by a command of the supervisory controller via the rotation platform controller to the rotation platform.

4. The method of claim 3 further comprising the step of determining a change in degrees of each angular interval of said collecting acoustic data step by ensuring that spatial displacements of the hydrophone line array and the reference hydrophones are small relative to a length scale of variations in acoustic pressure across a frequency band.

5. The method of claim 4 wherein a system of coordinates with unit vectors "$\hat{x}$", "$\hat{y}$", and "$\hat{z}$" constitute an orthogonal basis aligned with the boundaries of the tank; and
wherein dimensions of the tank in the $\hat{x}$, $\hat{y}$, and $\hat{z}$ directions are defined as "$l_x$", "$l_y$", and "$l_z$", respectively such that conditions for an acoustic pressure "p" on boundaries of the tank are provided by $$\left.\frac{\partial p}{\partial x}\right|_{x=0} = \left.\frac{\partial p}{\partial x}\right|_{x=l_x} = 0$$

$$\left.\frac{\partial p}{\partial y}\right|_{y=0} = \left.\frac{\partial p}{\partial y}\right|_{y=l_y} = 0$$

$$\left.\frac{\partial p}{\partial z}\right|_{z=0} = 0 \quad p\Big|_{z=l_z} = 0.$$

6. The method of claim 5 wherein acoustic normal modes exist as determined by the tank dimensions $l_x$, $l_y$, $l_z$, and a sound speed "c; and
wherein acoustic wave number components "$k_x$", "$k_y$", and "$k_z$" that satisfy resonance conditions are provided by $$k_x = \frac{n_x \pi}{l_x}, \qquad n_x = 0, 1, 2, 3, \ldots, \infty$$

$$k_y = \frac{n_y \pi}{l_y}, \qquad n_y = 0, 1, 2, 3, \ldots, \infty$$

$$k_z = \begin{cases} 0, & n_z = 0 \\ \frac{(2n_z - 1)\pi}{2l_z}, & n_z = 1, 2, 3, \ldots, \infty \end{cases}$$

with "$n_x$", "$n_y$" and "$n_z$" being indexes to identify mode number components in the $\hat{x}$, $\hat{y}$ and $\hat{z}$ directions.

7. The method of claim 6 wherein an acoustic wavenumber k relates to the frequency f and the sound speed c in water by $$k = \frac{2\pi f}{c};$$

and
wherein said method further comprises the steps of computing natural frequencies $f_{n_x,n_y,n_z}$; and
determining the resonance conditions for sound waves in the water-filled tank by $$f_{n_x,n_y,n_z} = \frac{c}{2\pi}\sqrt{k_x^2 + k_y^2 + k_z^2}.$$

8. The method in accordance with claim 7, said method further comprising the steps of:
determining a sound pressure amplitude $P_{n_x,n_y,n_z}$ throughout the water-filled tank by a modal amplitude $A_{n_x,n_y,n_z}$, wavenumber components $k_x$, $k_y$, and $k_z$, and location x, y, z, within the water-filled tank as relatable by $$p_{n_x,n_y,n_z} = A_{n_x,n_y,n_z} \cos(k_x x)\cos(k_y y)\cos(k_z z); \text{ and}$$

determining a sound pressure amplitude "P" realized by the acoustic projector at that location as shown by $$A_{n_x,n_y,n_z} = P_o \cos(k_x x_P)\cos(k_y y_P)\cos(k_z z_P).$$

9. The method in accordance with claim 8, said method further comprising the steps of:
calculating a mean squared sound pressure as a function of frequency from a Fourier transform and a complex conjugate P*(f) wherein the Fourier transform P(f) relates to a time varying sound pressure p(t) and wherein a finite signal duration is T and j is the square-root of minus one as shown by $$\int_{-T/2}^{T/2} p(t)e^{-j2\pi ft}dt = P(f);$$

and
defining the contour for rotation of the rotation platform by an elevation "z" above the floor of the water-filled tank;
observing an energy-like quantity $E_P$ of the line of hydrophones array at the elevation z, the integral of the mean squared sound pressure over the frequency interval [$f_1$, $f_2$] and the closed contour $C_z$ as provided by $$T \oint_{\theta_n}^{\theta_n+2\pi} \int_{f_1}^{f_2} P(\theta, f) \cdot P^*(\theta, f) df \, d\theta = E_P$$

wherein an integrand is the inner product of the Fourier transform P of the acoustic pressure and the complex conjugate P*.

10. The method in accordance with claim 9, wherein said step of rotating the rotation platform with the rotation on the contour following the plurality of discrete angles includes a range of the angles determined by $$\sum_{\theta_n}^{\theta_n+2\pi} T\Delta\theta \sum_{f_1}^{f_2} P(\theta, f) \cdot P^*(\theta, f)\Delta f = E_P \text{ and } P(f)M(f) = V(f);$$

observing the hydrophone line array and the calibrated reference hydrophone under the same energy-like acoustic parameter $E_P$; and calculating a summation over an interval $[f_1, f_2]$ and the angular resolution $\Delta\theta$ to yield an energy-like quantity $E_V$ for a mean squared hydrophone output voltage $V_i$ in a frequency band spanning $[f_1, f_2]$ as $$\sum_{\theta_n}^{\theta_n+2\pi} T\Delta\theta \sum_{f_1}^{f_2} V_i(\theta, f) \cdot V_i^*(\theta, f)\Delta f = E_V$$

wherein $V_i(f)$ is the complex voltage spectrum observed by the $i^{th}$ hydrophone in the array, computed as the complex discrete Fourier transform of a voltage time history $v_i(t)$.

11. The method in accordance with claim 10, said method further the step of calculating a receive voltage sensitivity of a hydrophone in the hydrophone line array as a square-root of a ratio of the parameters $E_P$ and $E_V$ by computing a modulus of receive voltage sensitivity $|M_i(f_1, f_2)|$ of the hydrophone in the frequency band $[f_1, f_2]$ in volts per micro-pascal by $$|M_i(f_1, f_2)| = \sqrt{\frac{E_V}{E_P}}.$$

12. The method in accordance with claim 11 wherein a common frequency set for evaluation is a set of one third octave bands wherein the sensitivities are stated at a center frequencies $f_c$, of a band with upper and lower band limits $[f_1, f_2]$.

13. The method in accordance with claim 12 wherein estimates for a value of the parameter $E_P$ can be improved such that said method further comprises the step of:

sampling a vertical field structure of the cylindrical test fixture within the water-filled tank with a plurality of calibrated references hydrophones affixed to the test fixture at various vertical displacements.

* * * * *